United States Patent [19]
Linder et al.

[11] 3,827,237
[45] Aug. 6, 1974

[54] METHOD AND APPARATUS FOR REMOVAL OF NOXIOUS COMPONENTS FROM THE EXHAUST OF INTERNAL COMBUSTION ENGINES

[75] Inventors: Ernst Linder, Muhlacker; Richard Zechnall; Josef Wahl, both of Stuttgart; Peter Jergen Schmidt, Schwieberdingen, all of Germany

[73] Assignee: Robert-Bosch GmbH, Herlingen-Schillerhohe, Germany

[22] Filed: Oct. 24, 1972

[21] Appl. No.: 300,047

[30] Foreign Application Priority Data
Apr. 7, 1972  Germany............................ 2216705

[52] U.S. Cl..................... 60/274, 60/276, 60/285, 60/289, 60/301, 123/32 EA, 123/119 R, 123/140 MC
[51] Int. Cl.............................................. F02b 75/10
[58] Field of Search ............. 60/274, 284, 285, 301, 60/276, 289, 290; 123/32 EA, 119 R, 140 MC

[56] References Cited
UNITED STATES PATENTS

| | | | |
|---|---|---|---|
| 2,244,669 | 6/1941 | Becker | 60/276 |
| 3,086,353 | 4/1963 | Ridgway | 60/290 |
| 3,599,427 | 8/1972 | Jones | 60/274 |
| 3,696,618 | 10/1972 | Boyd | 60/285 |
| 3,708,980 | 1/1973 | Truxell | 60/301 |
| 3,730,157 | 5/1973 | Gerhold | 123/119 R |
| 3,738,341 | 6/1973 | Loos | 123/119 R |
| 3,745,768 | 7/1973 | Zechnall | 60/285 |
| 3,768,259 | 10/1973 | Carnahan | 60/285 |

FOREIGN PATENTS OR APPLICATIONS
1,043,717  11/1958  Germany............................ 60/285

*Primary Examiner*—Douglas Hart
*Attorney, Agent, or Firm*—Flynn & Frishauf

[57] ABSTRACT

A reactor to oxidize unburned hydrocarbons and carbon monoxide is connected to the exhaust system of the engine. A further reactor is connected to the exhaust system designed to reduce nitrogen-oxygen compounds ($NO_x$). A temperature sensing device senses the temperature of the reactors, and air is admitted to the exhaust system of the engine to control the temperature thereof; an oxygen signal is being sensed representative of oxygen component in the exhaust system of the engine and the mass ratio of air to fuel of the mixture supplied to the engine is controlled to provide for proper air-fuel ratio with minimum noxious exhaust. The two control loops thus formed are interconnected by the internal combustion engine, the control effects of the two control loops being balanced with respect to each other.

36 Claims, 12 Drawing Figures

METHOD AND APPARATUS FOR REMOVAL OF NOXIOUS COMPONENTS FROM THE EXHAUST OF INTERNAL COMBUSTION ENGINES

CROSS REFERENCE TO RELATED PATENTS AND APPLICATIONS:

U.S. Pat. No. 3,483,851, Reichardt, Dec. 16, 1969; U.S. Pat. No. 3,745,768 filed Mar. 30, 1972, Zechnall et al.; U.S. Pat. No. 3,782,347 Ser. No. 259,157, filed June 2, 1972, Schmidt et al.; U.S. Ser. No. 265,547, filed June 23, 1972, Wahl et al.; U.S. Ser. No. 259,134, filed June 2, 1972, Topp et al.; U.S. ser. No. 267,562, filed May 6, 1972, Eichler et al.; U.S. Ser. No. 266,673, filed June 27, 1972, Eichler et al.; U.S. Ser. No. 282,848, filed Aug. 22, 1972, Eichler et al.; U.S. Ser. No. 283,177, filed Aug. 23, 1971, Eichler et al.; U.S. Ser. No. 271,009, filed July 12, 1972, Scholl; U.S. Ser. No. 298,108, filed Oct. 16, 1972, Wahl et al.; U.S. Ser. No. 296,601, filed Oct. 11, 1972, Schneider et al.

The present invention relates to a method and apparatus to remove noxious components from the exhaust gases of an internal combustion engine, and more particularly to a system in which reactors are connected to the exhaust system to oxidize unburned hydrocarbons and carbon monoxide and to reduce nitrogen-oxygen compounds.

Various apparatus and processes are known to reduce noxious components from the exhaust system of internal combustion engines in which two catalytic reactors are used. One reactor has ammonia added additionally in order to obtain as complete reduction of nitrogen-oxygen compounds ($NO_x$) as possible. Such systems require a fair amount of apparatus and, additionally, a supply of ammonia. Additional difficulties arise during the warm-up phase of the internal combustion engine, and in operation of the internal combustion engine when the outside temperatures are low, since the catalyst in the reactors must reach a certain predetermined operating temperature before they can effectively remove noxious components from the exhaust gases.

It is an object of the present invention to improve the method and apparatus of the prior art so that the operating temperature of the reactors will be reached quickly, as the engine is started or when operating in very cold environments, and which uses a simple reactor system without requiring the addition of ammonia or other substances not already available on ordinary motor vehicles or in connection with other internal combustion engines.

SUBJECT MATTER OF THE PRESENT INVENTION:

Briefly, two control loops are provided. A first control loop has a temperature sensitive element which senses the temperature of the reactors. This temperature sensor controls an additional air supply. A second control loop uses as a sensing element an oxygen sensor located in the exhaust stream of the internal combustion engine which controls the mass ratio of air to fuel over a mixing controller. The two controlled loops are linked together by means of the internal combustion engine, and addition of air, if commanded by the first control loop or temperature sensor also influences the mixing ratio of air to fuel, hereinafter referred to as air number λ.

Assuming that the engine starts cold, or under very cold outside temperature conditions, the temperature sensing device first provides a signal indicative of temperature which is too low, thus requiring additional air. The oxygen sensor in the second control loop will then provide a signal indicative of a mixture which is too lean, that is, insufficient fuel, and a more rich mixture will be controlled. The internal combustion engine, during warm-up, or when operating under very cold outside temperatures will thus operate with too rich a mixture and emit unburned hydrocarbons, the oxidation of which, by means of the additional air, will rapidly heat the first reactor, and, under low outside temperature conditions, will maintain both reactors at proper operating temperature.

The additional air can be applied to the exhaust manifolds or line directly, or through the various cylinders of a multi-cylinder internal combustion engine, which permits control of the air number λ to all cylinders of the internal combustion engine in common. It is also possible to apply the additional air to some cylinders of a multi-cylinder engine at the inlet side, that is, for example to the inlet manifold. During warmup, then, a portion of the cylinders will operate with a fuel-air mixture which is too rich, whereas the remaining cylinders will operate with a lean mixture. The cylinders operating with a rich mixture then provide the necessary unburned hydrocarbons, whereas the cylinders operating on the lean mixture will provide the additional air for combustion outside of the cylinders, and thus heating of the reactors.

The invention will be described by way of example with reference to the accompanying drawings, wherein:

FIG. 4b is an operating diagram of the oxygen sensor of FIG. 4a;

Reference in the specification will be made to the air number, denoted lambda (λ). This air number λ is a measure of the composition of the air-fuel mixture. The number λ is proportional to the mass of air and fuel, and the value of this number λ is one (λ = 1.0) if a stoichiometric mixture is present. Under stoichiometric conditions, the mixture has such a composition that, in view of the chemical reactions, all hydrocarbons in the fuel can theoretically combine with the oxygen in the air to provide complete combustion to carbon dioxide and water. For air and gasoline, the ratio, by weight, for $\lambda = 1$ is about 14.4:1. In actual practice, even with a stoichiometric mixture, unburned non-combusted hydrocarbons and carbon monoxide are contained in the exhaust gases.

Figure 11:
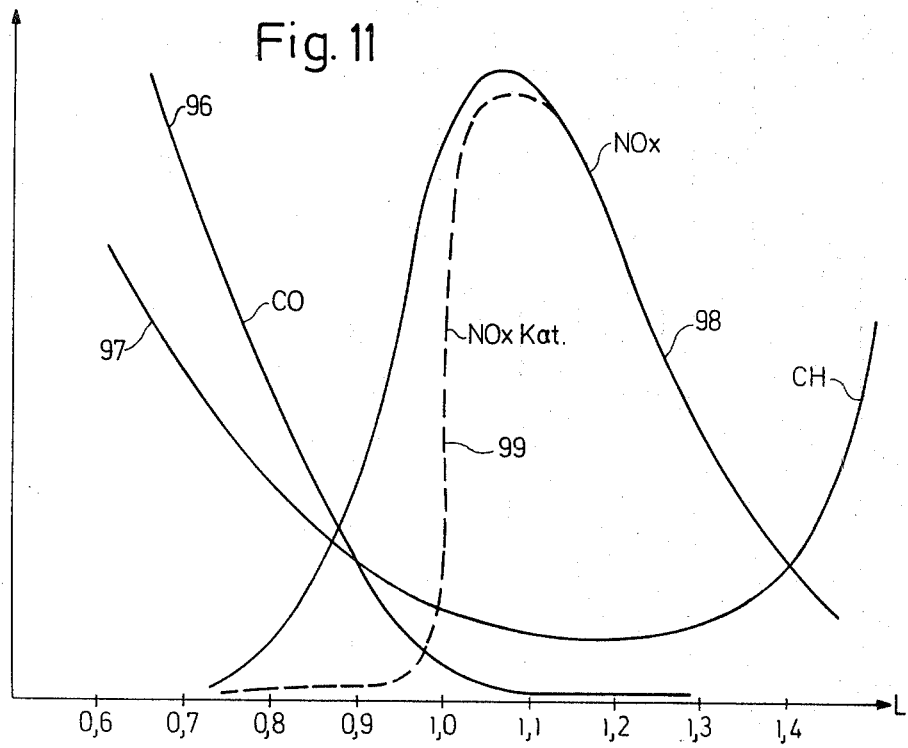
FIG. 11 is a graph illustrating the variation of the components of the exhaust gases emitted from an internal combustion engine.

Considering first FIG. 11, which illustrated the composition of the exhaust gases as a function of the air number $\lambda$. Curve 96 illustrates the CO content of the exhaust gases; below $\lambda = 1.0$, this CO decreases as the value of $\lambda$ approaches unity. Above $\lambda = 1.0$, the CO value remains essentially constant and is at a very low level.

Curve 97 illustrates the unburned hydrocarbon content (CH) which, up to the value of $\lambda = 1.3$ has roughly the same shape as curve 96. Above $\lambda = 1.3$, the content of unburned hydrocarbons rises rapidly. The composition of the exhaust gas now is affected by the number of misfires which occur within the internal combustion engine, that is, no combustion within the cylinders at all. These misfires are due to mixtures which are excessively lean.

Curve 98 illustrates the $NO_x$ content. As can readily be seen from FIG. 11, the $NO_x$ curve is approximately the opposite of curves 96, 97. It has a maximum value at approximately $\lambda = 1.05$. At air numbers which are more, or less, curve 98 drops rapidly. Nitrogen-Oxygen compounds arise only at high combustion temperatures by combustion of the nitrogen in the air. The combustion temperature reaches the maximum value at approximately stoichiometric mixture ($\lambda = 1.0$).

Curve 98 is a valid for the composition of the mixture in the exhaust manifold of the engine. If a catalytic reactor is connected to the exhaust manifold, then the $NO_x$ content, at the exit of the catalytic reactor, will illustrate a different relationship, as indicated by the broken line curve 99.

Under reducing exhaust gas conditions, that is, with fractional values of $\lambda$, the $NO_x$ compounds react in the catalytic reactor 29 with the CO and with hydrogen derived from unburned hydrocarbons CH. At low air numbers, the exit, or outlet of the catalytic reactor will exhibit practically no $NO_x$ components in the exhaust gas of the engine. If the air number $\lambda$ exceed unity, however, the composition of the exhaust gases changes suddenly from reducing to oxidizing, since more oxygen is present in the exhaust gas, and the $NO_x$ nitrogen-oxygen compounds can no longer be reduced in the reactor. For air numbers exceeding unity, therefore, the two curves 98, 99 coincide.

As is readily apparent from a consideration of FIG. 11, a good compromise is to operate the engine so that the exhaust gases of three components, carbon-monoxide, unburned hydrocarbons, and nitrogen-oxygen compounds are, overall, as low as possible with no one component contributing a substantial proportion to the overall exhaust gases.

Figure 1:
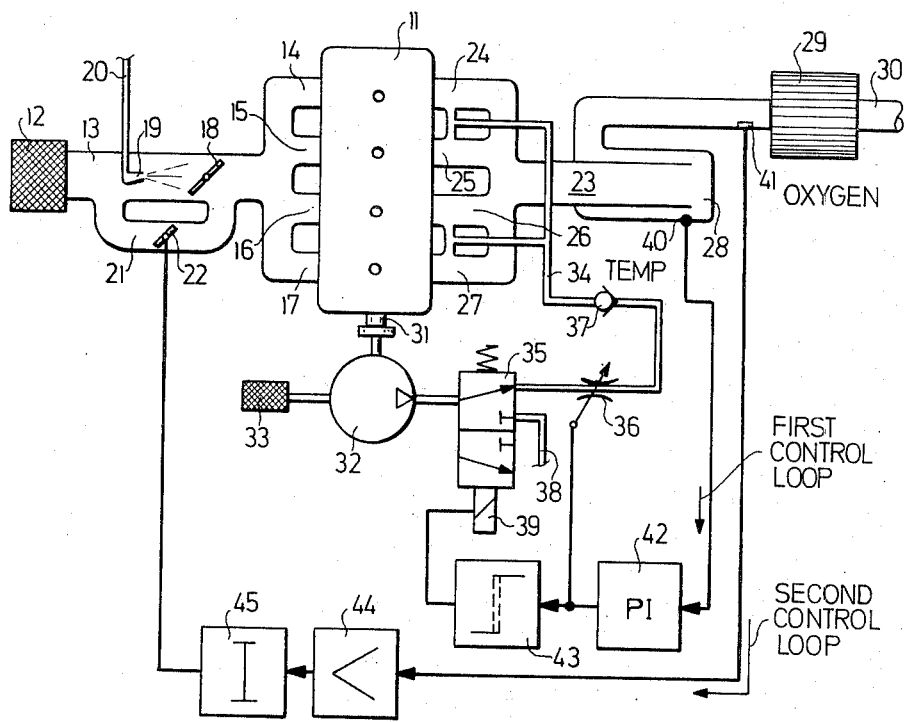
FIG. 1 is a schematic diagram of one embodiment of the present invention, applied to a four cylinder engine.

Referring now to the embodiments and specifically to FIG. 1: internal combustion (IC) engine 11, illustrated as a four cylinder engine, although any number of cylinders may be used, receives inlet air over an air filter 12 which is introduced into an inlet tube 13. The suction or inlet tube 13 branches to an inlet manifold having cylinder stubs 14, 15, 16, 17, which conduct applied air to the cylinders of the internal combustion engine 11. Throttle 18 is placed within the inlet tube 13.

Fuel, typically gasoline, is applied over line 20, to a nozzle 19, schematically representing a carburetion system, which may be much more complex. For purposes of the present invention, however, the simple illustration of a nozzle 19 suffices. A bypass line 21, having its own control throttle 22 introduces air behind main throttle 18; the bypass 21 may take in air from a separate air filter, or may be a branch shunting the introduction point of fuel, that is nozzle 19, and throttle 18.

Exhaust from the various cylinders of the internal combustion engine 11 is derived from the exhaust valve stubs 24, 25, 26, 27 which are joined together to an exhaust manifold line 23. The exhaust manifold 23 terminates in a thermoreactor 28, which forms a first reactor, to the output of which a second reactor, 29, is connected, for example by an exhaust pipe stub. Exhaust gases are exhausted from reactor 29 over exhaust pipe 30 which leads to a muffler system (not shown) and then to outside air.

Crank shaft 31 of the IC engine 11 drives a secondary air pump 32, for example over V-belt (not shown). A secondary air filter 33 is provided, through which pump 32 sucks in air to be applied to a three-way-two position (3/2) valve 35, then to be conducted over an adjustable throttle 36 and a check valve 37 to a pressure line 34. Pressure line 34 branches and the various branches terminate in the immediate vicinity of the exhaust valves (not shown) of the IC engine 11. The branches terminate in the several exhaust type stubs 24-27.

Valve 35 is illustrated in FIG. 1 in its operating condition, to which it is set by a solenoid winding 39, to provide air from secondary pump 32 to the controlled throttle 36. In quiescent condition, with a solenoid 39 deenergized, air from pump 32 is bypassed over a bleeder line 38 to the outside and to the ambient space.

A temperature sensing element 40 is secured to the inner wall of thermo reactor 28. An oxygen sensor 41 is secured in the path of the exhaust gases being conducted to the catalytic reactor 29, for example immediately in advance of reactor 29 in the exhaust pipe system of the IC engine. The electrical output of temperature sensor or temperature sensitive element 40 is connected in a first control loop to a first control amplifier 42, the output of which is connected to a threshold switch 43, as well as to the control input of throttle 36. The output of threshold switch 43 controls the magnet winding 39 of the 3/2 valve 35. If desired, the output can likewise be connected to pump 32, or for example to a clutch to stop pump 32 and thus avoid pumping air through filter 33 to be exhausted into space.

The electrical output of the oxygen sensor 41 is connected to a second controlled loop which includes a preamplifier 44 and a control amplifier 45, the output of which controls the position of throttle 22 in the auxiliary or bypass air duct 21.

Figure 2:
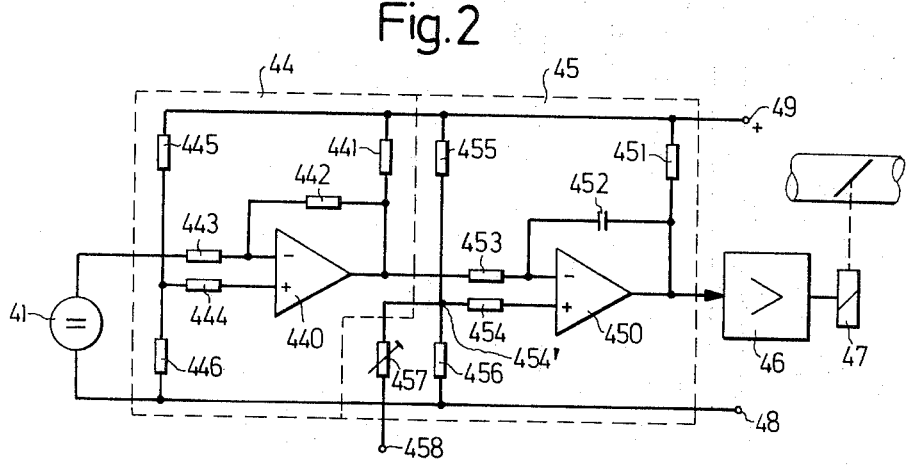
FIGS. 2 and 3 are electrical circuit diagrams illustrating the controlled loops for the oxygen (FIG. 2) and temperature (FIG. 3) sensors, respectively.

The circuit of the second control loop is illustrated in FIG. 2. Sensor 41 is connected to an operational amplifier 440, functioning as the preamplifier. Power is supplied over negative and positive buses 48, 49. Operational amplifier 440 has an inverse feed back resistor 442 connected from its output to the inverting input which, further, is connected over a coupling resistor 443 to the output of oxygen sensor 41. Non-inverting input of the operational amplifier 440 is connected over a coupling resistor 444 to the tap point of a voltage divider formed of resistors 445, 446, connected between buses 49, 48. A supply resistor 441 connected to positive bus 49 is additionally connected to the output of operational amplifier 440.

The second control amplifier 45 has operational amplifier 450 as its operating element, the output of which is connected over resistor 451 to positive bus 49. The output is additionally connected over an integrating capacitor 452 back to the inverting input thereof, which inverting input is further coupled by means of coupling resistor 453 to the output of operational amplifier 440, forming preamplifier 444. The non-inverting input of operational amplifier 450 is connected to the tap point 454' of a voltage divider formed of resistors 455, 456 connected across buses 48, 49. A trimmer or adjusting resistor 457 is connected to a terminal 458 to which a correction voltage can be applied.

The second control amplifier 45 is connected to a power amplifier 46 which controls winding 47 which operates, electromagnetically, throttle 22 in the auxiliary air pipe 21.

Figure 3:
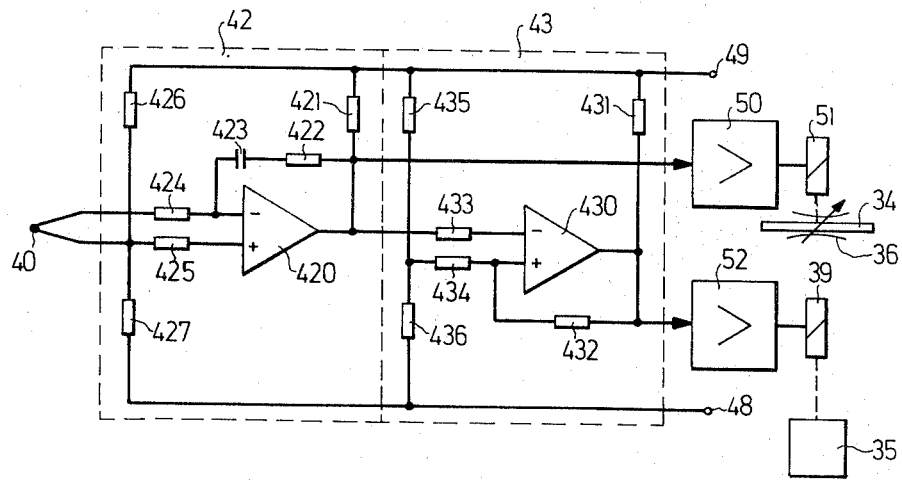

First control loop, FIG. 3: the amplifier 42 and threshold switch 43 again utilize operational amplifiers. The temperature sensing element 40 is a thermo couple connected over coupling resistors 424, 425 to the inverting and noninverting inputs of an operational amplifier 420. Operational amplifier 420 has its output connected over coupling resistor 421 to positive bus 49 and further, over a series circuit including resistor 422 and capacitor 423 back to the inverting input thereof. The non-inverting input, a head of coupling resistor 425 is connected to the tap point of a voltage divider formed of resistors 426, 427 connected across buses 48, 49. The circuit of the threshold switch 43 is similar to that of the preamplifier 44 of FIG. 2, and similar elements have been given reference numerals less 10 than in FIG. 2, and need not be described in detail again. The main difference arises in that the feed back resistor is not, as in preamplifier 44, an inverse feedback coupling resistor 442 but rather a positive feedback resistor 432 connected from the output of the operational amplifier 430 to the non-inverting input thereof.

Control amplifier 42, that is the output of operational amplifier 420 is connected to a power amplifier 50, the output of which controls solenoid winding 51 which is connected to change the position of throttle 36 in the additional air line. The output of operational amplifier 430, which functions as a threshold switch, is connected to a power amplifier 52, which controls the solenoid winding 39 of the 3/2 valve 35.

Figure 4A:
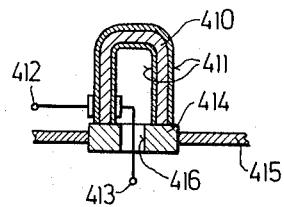
FIG. 4a is a schematic cross-sectional view of an oxygen sensor.
Figure 4B:
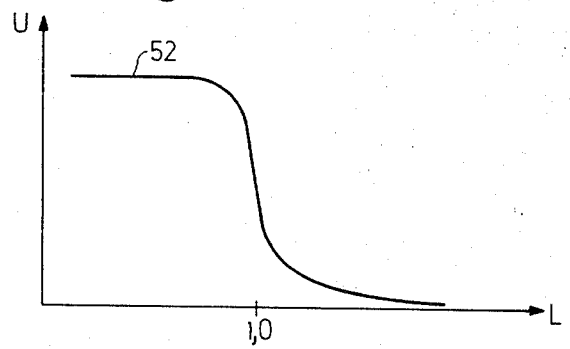

Oxygen sensor 41, with reference to FIGS. 4a and 4b: a tube 410, closed at the end, and sintered from a solid electrolyte body is coated at both sides with a microporous platinum layer, for example by depositing platinum thereon. The two platinum layers 411 are provided with contact terminals which are brought out to wire terminals 412, 413. A socket 414 is provided to hold the sintered solid electrolyte in the wall 15 of the exhaust pipe, so that the solid electrolyte is exposed at one side to exhaust gases and at the other, through an opening 416 formed in the socket 414, to ambient air. The output voltages derived from the element 41, with respect to air number λ is shown in the graph of FIG. 4b. As can be seen, at a value of λ = 1.0, there is a rapid change in output voltages.

The solid electrolyte 410 of the sensing element 41 is oxygen ion conductive at the temperatures which usually pertain within the exhaust gas flow. A typical solid electrolyte may be zirconium dioxide. When the oxygen partial pressure of the exhaust gases deviates from the oxygen partial pressure of outside, ambient air, a voltage will arise at the two terminals 412, 413, the relationship of which, with respect to air number λ is illustrated by curve 52, FIG. 4b. This voltage depends logarithmetically on the quotient of the two oxygen partial pressures at both sides of the solid electrolyte 410, and the output voltage of the sensing element 411 changes rapidly, in step-curve fashion at the air number λ = 1.0. Such an oxygen sensor is particularly suitable to control the second control amplifier 45, since the output voltage is highly dependent on the air number λ. Air numbers λ having a value of about 1.0 can be controlled particularly well.

Operation, with reference to FIG. 1: the air-fuel mixture becomes leaner as the bypass throttle 22 opens. Bypass 21, with throttle 22 is so dimensioned that an average, median position of the bypass valve 22, coupled with the setting of the carburetor and nozzle 19, and throttle 18 provides a mixture of fuel-air which has an air number λ approximately equal to 1.0. This mixture is burned in IC engine 11, and the exhaust gases are collected in the exhaust manifold 23 to be applied to the thermo reactor 28 and then to catalytic reactor 29. Oxygen sensor 41 measures the oxygen content and provides an output signal in accordance with curve 52 (FIG. 4b) of the actual air number of the exhaust gases. The output voltage is preamplified in preamplifier 44. This preamplifier 44 functions as an inverting amplifier since the operational amplifier 440 has its inverting input connected to the sensing element 41 (see FIG. 2). The output voltage of preamplifier 44 thus increases with increasing air number.

The second control amplifier 45 operates as an integrating controller due to the presence of the integrating capacitor 452 in the feedback circuit of operational amplifier 450, and thus the control amplifier 45 in FIG. 1 has been labeled I. The desired value of the air number, that is the command value, can be set by means of a voltage applied to terminal 458 and adjusted by trimmer resistor 457 (FIG. 2), and additionally by suitable dimensioning of the resistors of voltage divider 455, 456, so that a proper and suitable voltage appears at junction 454'. Effecting adjustment by means of a command voltage over terminal 458 and by means of trimmer resistor 457 has the advantage that the voltage applied to terminal 458 can depend on a further operating, or ambient parameter of the engine, for example outside temperature, temperature of the engine cooling liquid, or the like.

To illustrate the control effective by the system in accordance with FIG. 1, let it be assumed that carburetor and throttle system 18, 19, 20 provides a mixture having an air number which is slightly high, that is, provides a somewhat lean mixture. The output voltage of oxygen sensing element 41 decreases, causing an increase in output voltage at preamplifier 44 with respect to the voltage set by voltage divider 455, 456, which provides a reference value. The second control amplifier 45 integrates in negative direction, so that the input voltage of the power amplifier 46 continues to decrease.

Power amplifier 46 is so designed that it provides amplification without signal inversion, so that the bypass valve 22 moves in closing direction. Closing of bypass throttle 22 causes less air to be supplied to the intake manifold of the engine, so that the mixture (assuming the setting of the carburetion system 18, 19, 20 to remain constant) will become richer. The air number λ will thus fall below a command value. The second control amplifier 45 will then commence to integrate in positive direction to gradually open bypass valve 22.

Curve 52 (FIG. 4b) is very steep and thus the air number λ oscillates with only little amplitude about the command value. A suitable commanded value is λ = 0.98 to 0.99, to insure that the catalytic reactor 29 will operate in a reducing atmosphere.

The difficulty which arises is that the thermo reactor 25 must reach an operating temperature of 800° to 1000°C for proper operation, and further, that the catalytic reactor 29 must have an operating temperature which is still above 600°C. Due to the air number control, effected by the second control loop, the base emission of hydrocarbons and carbonmonoxide is so low that the operating temperature of the thermo reactor 28 will be approached only gradually as the engine warms up. The same difficulty arises when the outside or ambient temperatures are very low, since thermo reactor 28 will radiate heat proportional to the fourth power of the temperature difference between the reactor wall and outside temperature. If only the second control loop were present then, for example during operation in wintertime, the operating temperature of the thermo reactor 28 may reamin below 600°C so that hydrocarbons and carbon monoxide are only insufficiently burned.

The first control loop, with temperature sensor 40 and control amplifier 42 is provided in order to avoid this difficulty. The output voltage of thermo element 40 rises with increasing temperature. The first control amplifier 42, due to the presence of resistor 422 and integrating capacitor 423 in the feedback circuit is a proportional-integral controller and is indicated as such in FIG. 1. This characterizes a controller which has as a control characteristic both a proportional, as well as an integrating characteristic portion. The operational amplifier 420 is controlled at its inverting input, and thus the output voltage of the first control amplifier 42 decreases as temperature increases. The threshold value of the threshold switch 43 is determined by the voltage divisional ratio of voltage divider 435, 436.

If the reactor temperature exceeds the operating temperature, that is, exceeds a commanded value of about 900°C, for example, then the output voltage of operational amplifier 420 will be below the top voltage of voltage divider 435, 436 and the output of operational amplifier 430 rises suddenly to positive voltage. The power amplifier 52 is so designed that it effects a sign inversion, so that, in this case, solenoid winding 39 of the 3/2 valve 35 is deenergized. The valve path will therefore shift and air will no longer be supplied to pipe 34 through the throttle 36, but rather will be bypassed over line 38 to ambient space, and the control system operates, as above described, with only the second control loop 41, 44, 45 controlling the composition of the exhaust gases being sensed by sensor 41. If desired, pump 32 can be disconnected, or a clutch disabled.

Under low ambient temperatures, or upon start-up, or under any conditions during which the reactor temperature of thermo reactor 28 drops below the commanded value, then the output voltage of operational amplifier 430 will be essentially at negative, or chassis potential. Magnet winding 39 is energized. The secondary air pump 32 provides secondary air 34 into the output stubs 24–27. The additional secondary air is sensed by the oxygen sensor 41, and simulates an air number which is too high, that is, in excess of unity. As a result, the second control loop 41, 44, 45, 22 will provide less air through the line 21 thus controlling the input air-fuel mixture to IC engine 11 to be richer. A richer mixture results in a higher emission of CO and hydrocarbons (see FIG. 11) which can be burned, together with a secondary air, in a thermo reactor 28, thus heating thermo reactor 28. Combustion is insured by terminating the air pressure line 34 immediately adjacent to the outlet valves in the outlet stubs 24–27, since flames still penetrate to these positions in the engine even after opening of the outlet valves during the exhaust stroke of the engine.

The heat of combustion, that is, the heat derived from burning hydrocarbons and carbon monoxide heat reactor 28 and catalytic reactor 29. The oxygen sensor 41 insures that the mixture provided by the carburetion system 18, 19, 20 is enriched to such an extent that the emitted hydrocarbons and carbon monoxide completely burn in reactor 28. Illustrative example: let the air number in the inlet pipe or manifold 13 be L1, and the air number in the exhaust manifold be L2. Inlet pipe 13, during warm-up of the IC engine 11 may have an air number L1 of, for example, 0.8. Secondary air must be added to the exhaust lines 24–27 in an amount sufficient so that the exhaust manifold 23 will have a resulting air number L2 equals 0.98. If this same secondary air quantity were to be applied to the exhaust manifold 23 with a stoichiometric mixture of L1 equals 0.98 at the inlet side, then the eventual air number at the exhaust manifold would be L2 equals 1.18. This air number L2 is, however, only of theoretical interest although, as will appear below, different air numbers L1 and L2 may be commanded. The control characteristics of the first control amplifier 42 exhibit a proportional section. The two air numbers L1 and L2 deviate from their arithmetic mean, that is, from the resulting air number L = 0.98 in relationship to the gap between operating reactor temperature and actual reactor temperature. If the actual reactor temperature is low, the output voltage of the first control amplifier 42 is relatively high and the controllable throttle 36 is wide open, by control over the power amplifier 50 and control winding 51. The secondary air being admitted thus sets the air number L2 to a high value, and the second control loop 41, 44, 45, 22 thus must provide a low air quantity, that is, a low air number L1.

As the reactor temperature increases — sensed by thermo couple 40 — the air throttle 36 closes more and more. When the commanded temperature of the reactor is reached, valve 35 is reset into its base position and supply of secondary air through type 34 is completely interrupted. The 3/2 valve 35 is provided so that secondary air pump 32 can idle, so that power is not derived from the IC engine 11. As sonn as secondary air can be bled to the outside, pump 32 will no longer require power supply, thus saving in fuel. The controllable throttle 36 is not a necessary feature of the embodiment of FIG. 1, and the analog, or continuously variable control in the first control loop can be replaced by an on-off control arrangement. This provides for particularly rapid heating of the thermo reactor 28, since the full quantity of secondary air is supplied by air pressure line 34 during the time that threshold switch 43 responds to open the air supply to the exhaust manifold stubs 24–27. The engine 11 is thus supplied during the entire warm-period with maximum unsymmetry of the two air numbers L1 and L2. This simplified embodiment has a disadvantage, however, namely that if the IC engine 11 is operated in a cold environment, for example in a severe winter, because it is then possible to operate the engine only either with similar air numbers L1 and L2 or with air numbers of maximum relative departure. The unsymmetrical operation of the engine, with maximum gap between the air numbers causes some decrease in operating efficiency of the engine, and thus in power output of the engine. This is particularly noticeable when the threshold switch responds, that is, when there is a change-over from unsymmetrical air number operation to symmetrical operation (no auxiliary air through pipe 34), which may result in a jolt if change-over should occur just as the engine is being accelerated.

The second control amplifier 45 is an integral controller, in accordance with the embodiment of FIG. 1. The practical experience has found this type of control characteristics to be desirable. Changes in the output signal of the oxygen sensor 41 due to aging effects are thus compensated, and further, short-time control oscillations are reliably suppressed, which may otherwise arise if a strict proportional controller is used. The by-pass valve 22 may be frequently opened and closed, in rapid sequence, due to the steep characteristics of curve 52 (see FIG. 4b) of the characteristics of sensor 41. The first control loop including temperature sensor 40, which has a much more gradual response characteristic is not so apt to go into uncontrollable oscillations in the control loop. It is still, however, desirable to construct the control amplifier 42 with some integration characteristics, that is, to construct it to be a proportional-integral controller, although amplifier 42 may be either a proportional controller or, even a complete integrating controller without change in operation of the control loop, in principle.

Further embodiments will now be described, in which the same and similarly acting parts have been given the same reference numerals, and which will not be described again in detail.

Figure 5:
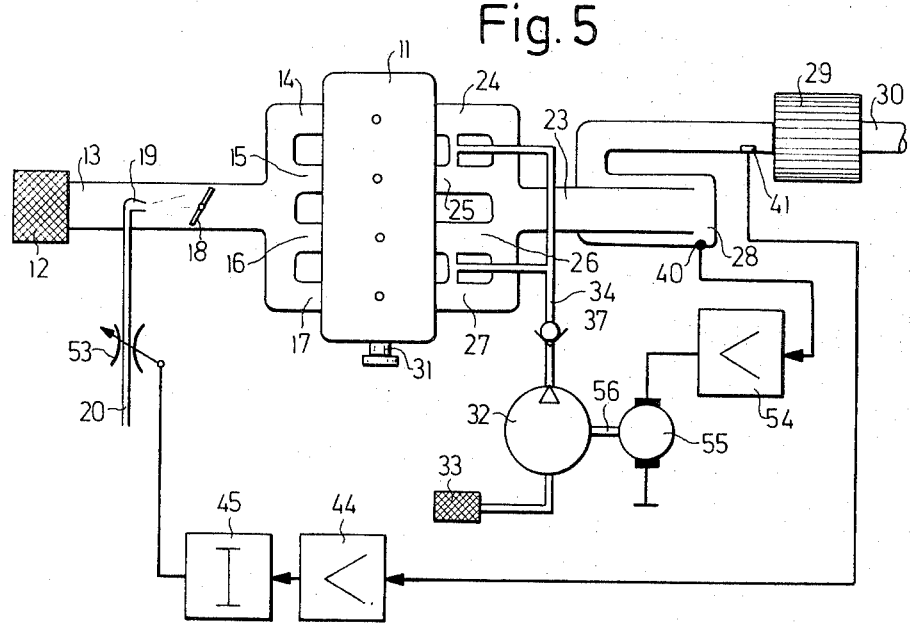
FIG. 5 is a schematic diagram illustrating a second embodiment of the invention.

Second embodiment, FIG. 5: The inlet pipe, leading to the inlet manifold is not provided with a bypass 21 as in FIG. 1, but rather, the air number λ is controlled by a variable or changeable valve or throttle 53 which is arranged in the fuel supply line 20 ahead of the main power jet of the carburetor, schematically indicated at 19, as in FIG. 1. The secondary pump 32 is driven by an electric motor 55 from a shaft 56, the output of the pump 32 being directly connected to pressure line 34 over check valve 37. The first control amplifier 54 is connected to temperature sensing element 40, and controls the operation of motor 55. The second control amplifier 45 controls the variable throttle 53.

The second control loop may be similar to the circuit of FIG. 2, with a change in power amplifier 46 being required, that is, the number of stages of power amplifier 46 must be so selected that a phase reversal will occur, that is, the valve 53 should open when the air number λ measured by the sensing element 41 increases. The control amplifier 54 may, again, be a proportional-integral controller in accordance with FIG. 3. The power amplifier of the portion of the first control amplifier 54 must be so designed that it can control operation of motor 55, for example including a pulse control circuit, as is customary in supplying electric motors from a battery.

Motor 55 drives pump 32 with increasing speed upon increase of operating voltage, or operating power supply (over time) if the reactor temperature 28 should drop, or be below a commanded value. The throttle 36 is then not required, since variable air supply is determined by the variable speed of motor 55. The check valve 37, as in the first embodiment, prevents escape of exhaust gases under pressure if no secondary air is supplied, that is, when motor 55 is stopped so that no air will be pumped through line 34 into the exhaust manifold.

Figure 6:
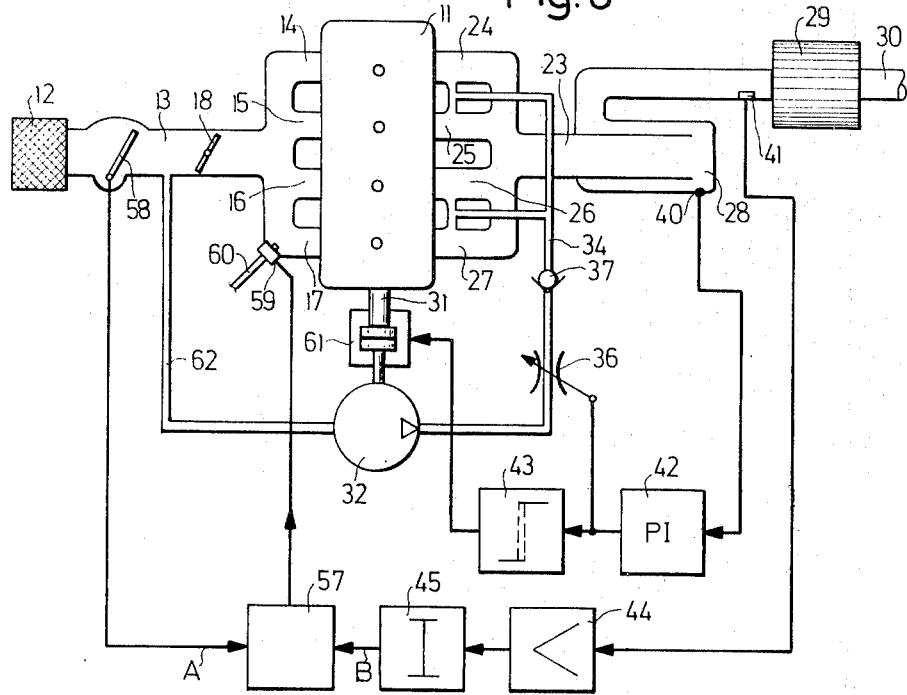
FIG. 6 is a schematic diagram illustrating a third embodiment of the invention.

Third embodiment, FIG. 6: The embodiments of FIGS. 1 and 5 have been described in connection with carburetor-supplied fuel. The embodiment of FIG. 6 utilizes a fuel injection system to provide fuel to the engine, which is controlled, for example, by a transistorized circuit 57 (see cross referenced U.S. Pat. No. 3,483,851). An air sensor 58 is located in the inlet pipe 13, which provides an electrical output connected to an input A of the fuel injection control circuit 57. Control circuit 57 has a second input B which is connected to the output of the second control amplifier 45. The electrical input, that is, the windings of the fuel injection valves 59 are connected to the output of the fuel injection control circuit 57, to provide fuel for the cylinders of the internal combustion engine, by injection at or close to the inlet valves, as schematically indicated by valve 59 located close to stub 17; the other injection valves have been omitted from the drawing, for clarity, although it is to be understood that, depending on fuel requirements, additional injection valves may be provided.

The circuit of the first control loop 40, 42, 43 is similar to that of the first example in accordance with FIG. 1. An electrical input of an electromagnetic clutch 61 is connected to the output of the threshold switch 43, the clutch being arranged between the crankshaft 31 and the drive shaft of the secondary pump 32. Secondary pump 32 provides air directly from a branch line 62 of the inlet pipe 13, taking the air from the zone between the air quantity transducer 58 and throttle 18, so that the air being supplied to the exhaust manifold is measured by the transducer 58.

Figure 7:
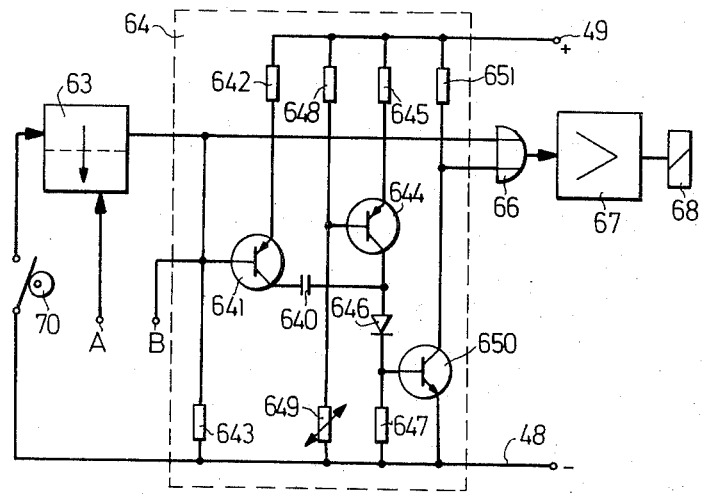
FIG. 7 is a fragmentary electrical circuit diagram useful in the third embodiment of FIG. 6.

The circuit of the pre-amplifier 44 and of the second control amplifier 45 may be similar to that illustrated and described in connection with FIG. 2. A basic circuit for the control circuit 57 is illustrated in FIG. 7.

The control circuit 57 is a transistorized circuit which has an input stage 63 which preferably is a monostable flip-flop, controlled by a pulse source schematically shown as a switch which opens and closes in synchronism with cyclical operation of the engine, and which is operated by a cam 70. The switch closes synchronously to engine rotation such that each injection valve 59 (FIG. 6) will have an injection pulse supplied thereto at each second crank shaft rotation. The correction input A is provided to change the unstable time of the monostable flip-flop (FF) 63 in dependence on measured air quantity, so that a greater air mass is being introduced, more fuel will be injected to hold the air number λ at a constant value.

A pulse extending stage 64 is connected to the output of the monostable FF 63, the pulse extending stage 64 including a storage capacitor 640. Capacitor 640 has its electrodes connected on the one hand to the collector of a transistor 641 and the other to the collector of a transistor 644. The emitters of transistors 641, 644 are connected, respectively, by resistors 642, 645 to positive bus 49. The base of transistor 641 is connected to the output of the monostable FF 63 and further to the input terminal B. A base resistor 643 connects to the negative bus or chassis 48.

Transistor 644, to which capacitor 640 is connected, functions as a discharge switch for capacitor 640. The base of the transistor 644 is connected to a voltage divider formed of a resistor 648 and a potentiometer 649. A phase reversing transistor 650 has its base connected to the collector circuit of transistor 644, the collector circuit including a series connected diode 646 and resistor 647. Diode 646 is so poled that the collector current of discharge transistor 644 is passed thereby. The base of phase reversal transistor 650 is connected over the resistor 647 to negative bus 48; the collector of transistor 650 is connected over collector resistor 651 to positive bus 48, and the output is likewise taken from the collector.

The output of the monostable FF 63 and from the collector of transistor 650 is connected, each, to one of two inputs of an OR-gate 66, connected in advance of a power amplifier 67, the output of which controls solenoid winding 68 which operates injection valve 59. The windings of the other injection valves can be connected in parallel to that of winding 68, if desired over a suitable distributor circuit.

Operation of circuit 57, FIG. 7: The basic operation is known and described in detail in the aforementioned cross referenced U.S. Patent. Briefly, the duration of the pulse derived from monostable FF 63 depends on the quantity of air passing to the inlet manifold. The output pulse of the monostable FF 63 is applied directly to OR-gate 66 to thus control the power amplifier to open. This pulse is then extended by an extension pulse derived from the extension stage 64.

The duration of the extending pulse is proportional to the duration of the output pulse from the monostable FF 63 and further is influenced by the resistor 649 which, for example, is a negative temperature coefficient resistor which measures engine temperature. The duration of the extension pulse can further be influenced by voltages applied to input B.

The voltage applied to input B controls the charging current of capacitor 640, by controlling the conduction of transistor 641 during the duration of the pulse derived from monostable FF 63. Thus, the voltage at terminal B influences the value of the voltage peak which is transferred upon termination of the output pulse of monostable FF 63 over capacitor 640. Changing the resistance of NTC resistor 649 changes the discharge current of the capacitor 640 and with it the instant of time at which the phase reversal transistor 650 again becomes conductive after having been blocked.

The concept of the 1-signal and a 0-signal will be used in the subsequent description, as customary in digital technology. If a junction has a 1-signal, then this junction is approximately at the voltage of the positive bus 49, whereas, when the junction is at a 0-signal, it is approximately at the voltage of the negative, or chassis bus 48.

The inverter transistor 650 is conductive when in quiescent state. This transistor can be blocked if a negative pulse is transferred thereto from the storage capacitor 640 upon termination of the output pulse of the monostable FF 63. The signal at the collector of the inverter transistor 650 thus provides a 1-signal, just as the output signal of the monostable FF 63. OR-gate 66 provides a 1-signal at its output when at least one of its inputs has a 1-signal thereat, so that the output pulses derived from stage 63 are extended by the output pulses of the extension stage, fitting, in time, after the pulse from stage 63.

Operation: Let it be assumed that the circuit 57 provides injection pulses which are too short, so that the air number λ is too long (similar to the first example). Oxygen sensor 41 therefore provides an output voltage which is too low for the second control amplifier 45 (see FIG. 2), and the second control amplifier will integrate in negative direction. The input B of the pulse extension stage 64 (FIG. 7) is connected to the output of operational amplifier 450 in the second control amplifier 45. The charging current through the transistor 640 will thus increase, and the extension pulse which is applied over the OR-gate 66 to the injection valve will increase and becomes longer, so that the air number λ decreases. When the air number λ drops below the value set by the voltage divider 455, 456, then the output voltage of the oxygen sensor 41 again changes rapidly, the second control amplifier 45 will integrate in positive direction and the extension pulse will again decrease. Similar cycles will repeat.

The air number control, as above described, is additionally affected, as in the first example, by the control loop responsive to temperature, that is, the first control loop including elements 42, 43. There are some differences; one difference with respect to the first example is that, when the reactor operating temperature is reached, the threshold switch 43 disengages clutch 61 so that secondary pump 32 no longer is in driving engagement with the engine and requires operating power. Thus, clutch 61 effectively replaces the 3/2 valve 35. A second difference is more basic: The secondary pumped air is not taken over a separate secondary air filter 33 but taken directly from inlet manifold 13. This saves the provision of a secondary filter 33 and additionally provides for more rapid response of the second control loop 44, 45, 57 with respect to temperature changes. In accordance with the first example, the entire exhaust gases must be mixed in the thermo reactor after a change of the secondary air quantity commanded by the first control loop, and then pass the oxygen sensor, before the oxygen sensor will respond. The third example, however, provides an immediate response since any change of secondary air quantity is sensed by the air sensing device 58, so that the transistorized switching circuit 57 commands increase of the duration of the injection pulses in relation to the added secondary air applied to the inlet valves.

With respect to a suitable air measuring device 58, reference may be had, for example, to the cross referenced application Ser. No. 296,601, filed Oct. 11, 1972.

The second advantage of the third embodiment, namely the decrease in response time of the second control loop 44, 45, 47 in its cooperation with the first control loop 42, 43 can be utilized effectively primarily when the air-fuel mixing system includes a fuel injection system, the injection duration of which is controlled by the air mass element or sensor 58. Nevertheless, the principle of the third example can also be utilized with other air-fuel mixing systems since omission of the secondary air filter 33 substantially simplifies the mechanical construction of the system.

Figure 8:
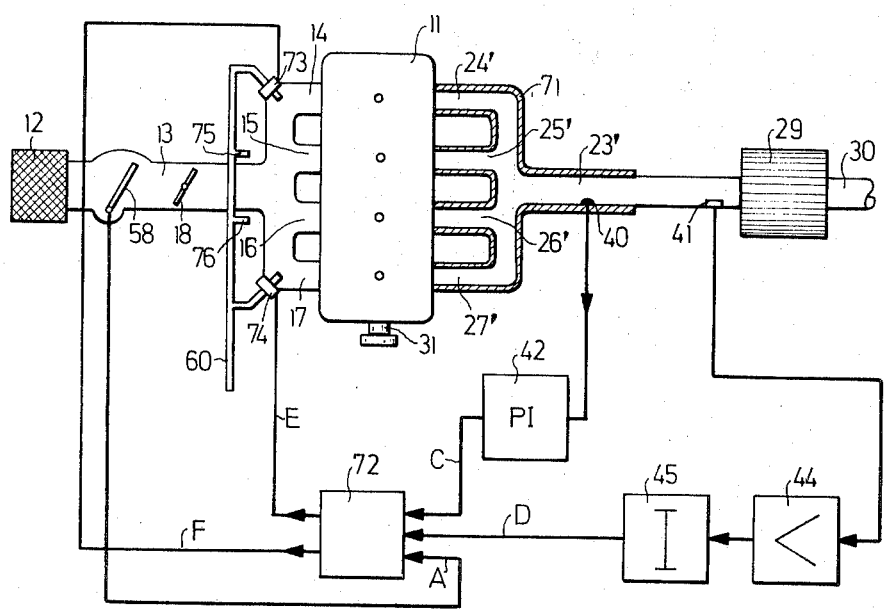
FIG. 8 is a schematic representation of a fourth embodiment.

Fourth embodiment, FIG. 8: The thermal reactor 28, described in connection with the first three embodiments, is not used herein. Rather, the exhaust manifold 23, as well as the exhaust stubs 24–27 are utilized as a thermo reactor, as shown at 23', 24'–27', by applying a thermally insulating wall 71 to the exhaust manifold and the exhaust stubs. The temperature sensing element 40 is secured to the inside of the thermally insulating wall 71.

As shown in FIG. 8, the air-fuel supply includes a fuel injection system, having an air flow transducer 58. Each inlet stub 14–17 has a fuel injection valve associated therewith, FIG. 8 illustrating two valves 73, 74 only (for clarity) to which fuel is supplied from a pressure line 60. Injection valve connecting stubs 75, 76 are shown, leading to the fuel injection valves which have been omitted.

A two-channel injection control system, which is transistorized, is schematically illustrated at 72. It has three inputs, A, C, D. Input A is connected to the air quantity or air flow transducer 58. Input C is connected to the output of the first control amplifier 42. The output of the second control amplifier 45 is connected to a third input D. The injection valves for the IC engine are combined in two groups, which is suitable for a four-cylinder engine, the two groups alternately being triggered to inject fuel. Injection valve 74 belongs to the first group and is connected with its electrical input to the first output E of the two-channel control circuit 72, whereas injection valve 73 is associated with the second group of injection valves and is connected to a second output F.

Figure 9:
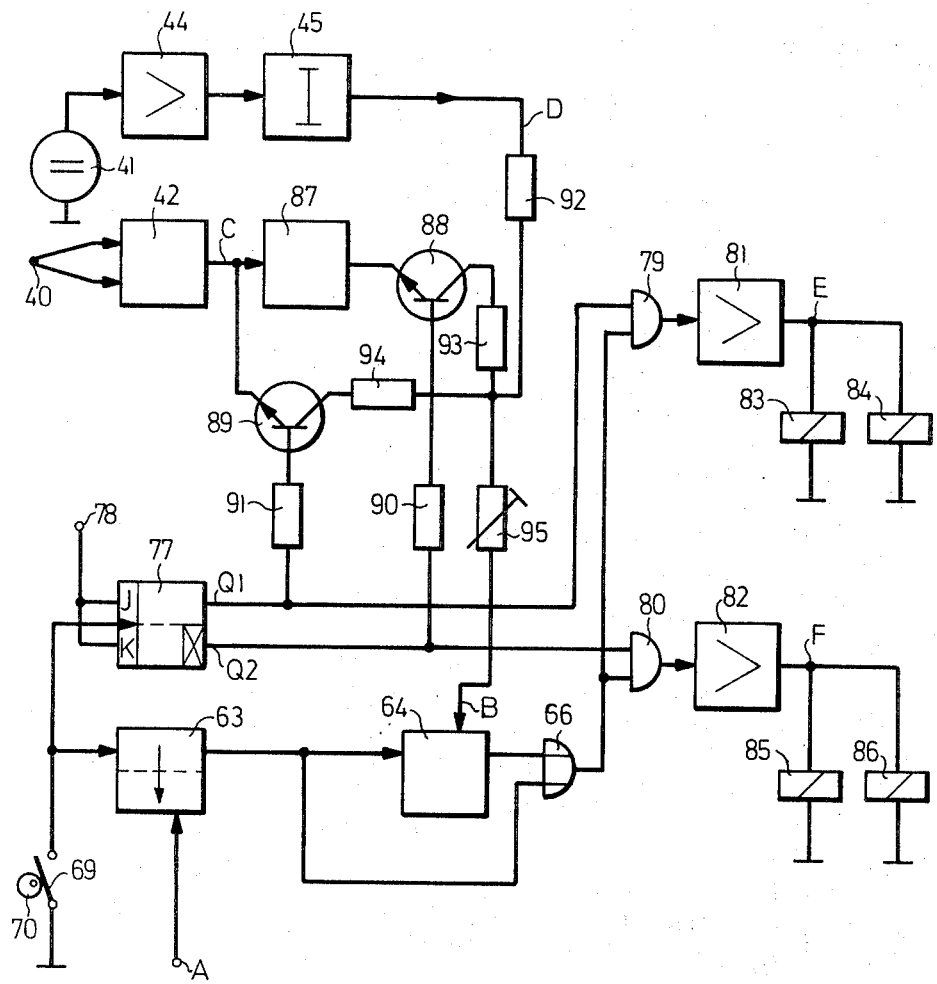
FIG. 9 is a fragmentary electrical circuit diagram for use in the fourth embodiment of FIG. 8.

FIG. 9 illustrates a schematic block diagram of the control circuit 72. Pulse source 69, illustrated as a switch, is controlled by a cam 70 rotating with the crank shaft of the engine, and supplies output pulses to a monostable FF 63 which is connected to a pulse extending circuit 64, as well as to an OR-gate 66, similar to the circuit of FIG. 7. Pulse source 69 is further connected to the clock input of an JK flip-flop 77, which is a bistable flip-flop having two set inputs J, K connected to a terminal 78. The output of the JK flip-flop 77 is taken from a pair of complementary output terminals Q1 and Q2.

The solenoid windings of the first group of injection valves are illustrated at 83 and 84; they are controlled by an AND-gate 79 and power amplifier 81. The output of the power amplifier 81 forms the first output terminal E of the two-channel control circuit 72. Similarly, control solenoids 85, 86 of the second group of injection valves are connected to output F, which forms the output terminal of a power amplifier 82 controlled by an AND-gate 80.

The two inputs of the first AND-gate 79 are connected to the output Q1 of the JK-FF 77 and to the output of OR-gate 66. The input of the second AND-gate 80 is connected to the second output Q2 and to the output of the OR-gate 66.

A trim, or adjusting resistor 95 is connected to the correction input B of the pulse extending stage 64. The other terminal of the trim resistor 95 is connected to a junction to which three adder resistors 92, 93, 94 are connected. First adder resistor 92 simultaneously forms the third input B of the two-channel control circuit 72 and, therefore, is connected to the output of the second control amplifier 45. The third adder resistor 94 is connected over the collector-emitter path of a switching transistor 89 to the second input C of the control circuit 72 and thus to the output of the control amplifier 42. The second adder resistor 93 is connected through the collector-emitter path of a switching transistor 88, connected to the output of a phase inverting amplifier 87, the input of which is likewise connected to the output of the first control amplifier 42. The base of the switching transistor 88 is coupled over resistor 90 to the second output Q2 of the JK–FF 77; the base of switching transistor 89 is coupled over resistor 91 to the first output Q1 of the JK–FF 77.

The pulse extending stage 64 is similar to that shown in and described in connection with FIG. 7. The operation of a JK–FF, utilized as a bistable flip-flop 77, is well known in digital circuitry, see, for example, "Digital Electronics" (Philips Technical Library 1969), Vol. 1, or other literature in the electronic circuitry field. Briefly, if terminal 78 has a one-signal applied thereto, the JK–FF 77 operates as a frequency divider, that is, the two outputs Q1 and Q2 change sign at each pulse applied to the pulse terminal T, in this case the terminal connected to pulse source 69. Since the two outputs Q1 and Q2 are complementary, with respect to each other, the signals derived therefrom appear at both terminals, alternately, with reverse polarity. As a result, the output pulses of the OR-gate 66, which determine the injection duration of fuel being injected by the valves are applied to those valves which, simultaneously, have a 1-signal appearing at the other line to the respective AND-gate. Thus, the first pulse at which the first output Q1 has a 1-signal is conducted over AND-gate 79 to the first power amplifier 81. The subsequent pulse provides a 1-signal at the second output Q2, and the output pulse from the OR-gate 66 is conducted over AND-gate 80 to the second power amplifier 82. As a result, the two groups of the injection valve coils 83, 84 and 85, 86, respectively, are alternately energized. The JK–FF 77 thus functions as a freqeuncy divider, and therefore the speed of the cam 70 must be twice the speed as that in the third example (FIG. 7) in which only a single group of injection valves is provided. Appropriate gearing can be used to provide the proper speed.

Amplifier 87, which is phase reversing, is connected similar to pre-amplifier 44 (FIG. 2). The amplifier 87 should have an amplification $a = -1$. The feedback resistor 442 and input resistor 443 thus must have the same value of resistance.

Operation: To simplify the description, let it be assumed that the operating temperature of the thermo reactor has been reached, that that the exhaust manifold 23' and the stubs 24'–27', which are thermally insulated, have the proper operating temperature and that, therefore, due to the high temperature the output of operational amplifier 420 (FIG. 3) of the first control loop 42 will have a low voltage, which is determined by the voltage division ratio, that is, by the relative value of resistance of the resistors 426, 427. This voltage must be of the same value as the output voltage of the second control amplifier 45 when the commanded value of air number λ has been reached. No additional current can then flow over the two adding resistors 93, 94 (FIG. 9) to the correction input B of unit 64, so that the correction input B is solely influenced by the output voltage of the second control amplifier 45. The feedback circuit in the first control amplifier must be so dimensioned, and set that the voltage which results when the reactor operating temperature is reached will be equal to the lower limiting voltage of the output from the operational amplifier 420. A lower voltage should not occur. The fourth example in accordance with FIG. 9 operates similarly to that of the third embodiment in accordance with FIG. 7 in this manner: If the air number λ is too high, control amplifier 45, adder resistor 92 and trim resistor 95 will apply a signal to the correction input B so that the impulse duration of the pulse extension stage 64 is increased, causing a change of the air number λ in negative direction, that is, to control the air number λ to a lower value, thus applying a richer mixture to the IC engine.

During warm-up of the IC engine, the operating temperature of the thermo reactor has not yet been reached. The first control amplifier 42 will then provide a positive output voltage to the second input C of the two-channel control circuit 72. When the first group 83, 84 of the injection valves is energized, the first output Q1 provides a 1-signal, which is applied over resistor 91 to the base of switching transistor 89, causing switching transistor 89 to become conductive. The increased output voltage of the first control amplifier 42 is then applied over the third adder resistor 94 and over trim resistor 95 to the correction input B of circuit 64. This decreases the charging current on the storage capacitor 640 (FIG. 7) to a value which is less than that which would be commanded, otherwise, solely by the output signal of the oxygen sensor 41. The pulse duration of the pulse extension stage 64 thus decreases and the air-fuel mixture applied to the cylinders with which the first group of injection valves 83, 84 is associated, becomes leaner. The air number L1 of the first group of cylinders thus increases above 1.0.

The next pulse applied to the pulse input of the JK-FF 77 (59) energizes the second group of valves with windings 85, 86, since the second output Q2 provides a 1-signal. Switching transistor 89 is, however, blocked during this condition since Q1 now has a 0-signal. Switching transistor 88, however, will become conductive so that the output signal of phase inverting amplifier 87 is applied to the correction input B of the pulse extension stage 64. The input voltage at the correction input B thus will be less than that which would correspond to the output signal of the oxygen sensor 41. In contrast to the operation when the first group of valves with windings 83, 94 was controlled, the second group of valves 85, 86 will have an extended pulse applied thereto, so that the air number L2 will have a value which is less than 1.0, resulting in a richer mixture. The deviation of the two air numbers L1 and L2 from the average value, that is, the non-symmetry will rise more as the reactor temperature is lowered, which is similar to the effect obtained with the first three examples.

The difference with respect to the first three examples essentially arises in that the first air number L1 is determined by air in the common inlet manifold 13 and the second air number L2 is determined by air flowing in the common exhaust manifold 23; in the fourth example, however, both air numbers are determined with respect to two groups of inlet manifolds, 14, 15, and 16, 17, respectively. During operation, in accordance with the fourth example, in the warmup phase of the engine the cylinders which operate with leaner mixture provide the additional combustion air for the common exhaust manifold, whereas those cylinders which operate with a richer mixture provide the unburned hydrocarbons and carbon monoxide which can be burned together with the additional air from the other cylinder groups in the thermally insulated exhaust manifold 23'.

Figure 10:
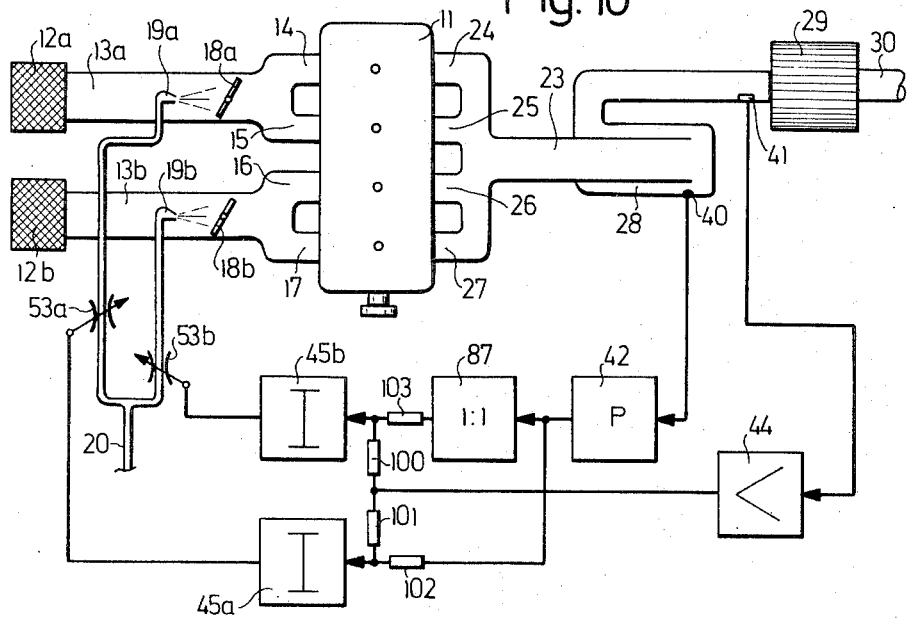
FIG. 10 is a schematic representation of a fifth embodiment of the invention.

Fifth embodiment, FIG. 10: Some internal combustion engines are operated with separate fuel-air mixture supply systems, as shown in FIG. 10, with separate carburetor units schematically indicated by inlet pipes 13a, 13b, carburetor nozzles 19a, 19b, and throttles 18a, 18b. The first carburetor system applies a fuel-air mixture to inlet stubs 14, 15, the second carburetor system supplies inlet stubs 16, 17. Each carburetor has a separate air filter 12a, 12b for air supply. Controlled valves or throttles 53a, 53b are interposed in the fule line 20 ahead of nozzles 19a, 19b, respectively.

Two control amplifiers 45a, 45b control the position of the controlled valves 53a, 53b. As in the fourth example, a phase inverting amplifier 87 is connected to the output of the control amplifier 42. The output of amplifier 44 is connected to a pair of adder resistors 100, 101, at their central connection, which are connected, in turn, to the inputs of the two control amplifiers 45a, 45b. A further adder resistor 102 is connected between the output of the first control amplifier 42 and the input to control amplifier 45a; a second adder resistor is connected to the input of control amplifier b, and, on the other hand, through the inverting amplifier 87 to the output of amplifier 42.

Operation: The principle of operation is similar to that of the fourth embodiment; the output of preamplifier 44 in the second control loop controls, symmetrically, the two control amplifiers 45a, 45b which control the amount of fuel being applied. Thus, the second control loop also controls the air number λ to a predetermined optimum value. If the reactor temperature of the thermo reactor is below the desired value, the first operating amplifier 42 provides an output signal which inversely controls the operation of the two control amplifiers 45a, 45b, due to the presence of the inverting amplifier 87 in one of the two branches. Thus, control amplifier 45a commands a fuel-air mixture which is too rich and control amplifier 45b commands a fuel-air mixture which is too lean. The desired degree of dissymmetry between the two air numbers L1 and L2 in the two carburetion systems can be adjusted by suitably dimensioning the resistors 102, 103. As in the fourth example, the unsymmetry of the air numbers is a function of the deviation of actual temperature of the thermo reactor 28 from commanded temperature; therm reactor 28 may, as illustrated in connection with FIG. 4, be a portion of the exhaust manifold system.

Rather than utilizing controlled valves 53a, 53b in the two carburetion systems, auxiliary air may be supplied, for example over bypass lines, which are controlled from the outputs of amplifiers 45a, 45b.

The removal of noxious exhaust gases from the IC engine is, in principle, similar in all examples: First, an air number λ is commanded in the second control loop which has the desired air number of the gases applied to the reactor 29. If the reactor system temperature is too low, an additional or first control loop is commanded to apply to at least a portion of the cylinders a mixture which has more fuel than necessary, so that initially the output from the cylinders will have a higher content of hydrocarbons and carbon monoxide, which higher content is burned by the addition of air. This additional air exactly compensates the higher amount of fuel so that, by presence of the second control loop, additional air and additional fuel will be exactly compensated so that the after burning combustion to heat the reactor will be essentially complete.

The additional air is taken through a portion of the cylinders of the engine in the fourth and fifth embodiments; as the air exhausts from the cylinders it is therefore already substantially heated and ignition of the exhaust gas-additional air mixture is insured already well below the reactor operating temperature. In the first three examples, ignition of the mixture of exhaust gas and additional air may cause difficulties if the internal combustion engine operates in very cold ambient conditions and has to warm up in cold weather and if the terminal ends of the air pressure line 34 cannot be conducted close enough to the outlet valves in the exhaust stubs 24–27. In order to insure combustion under all conditions, reliably, the ignition timing of the internal combustion engine can be changed (see the cross referenced applications) — to be delayed, under control of the first control amplifier 42, by taking an output signal from the first control loop. Delaying ignition causes flames to escape into the exhaust stubs 24, 27 after the exhaust valves of the engine have been opened.

It is an advantage of the system of the present invention — which is common to all examples — that the nitrogen-oxygen compound emission is low during the warm-up phase of engine operation. During warm-up, the mixture applied to the engine does not have the optimum air number $\lambda = 0.98$, but rather an air number which deviates substantially therefrom.

The actual air number supplied is much less than 0.98 and, as can be clearly seen from FIG. 11, the emission of $NO_x$ components is practically negligible. This is particularly important since, initially, the catalytic reactor 29 has not yet reached its operating temperature, usually between 600° to 800° C, and thus is not capable of reducing the $NO_x$ components. The hydrocarbons and carbon monoxide components, however, will not be emitted since, already during the warm-up phase, these components are burned in the afterburner, or thermo reactor 28, so that the overall exhaust emission is much better than that which would otherwise be obtainable.

Several of the components, amplifiers and the like used in the various examples may be combined in other combinations than those described and disclosed in detail. For example, the simplified thermo reactor described in connection with the fourth example (FIGS. 8, 9) can be used in any one of the examples disclosed. The drive of the secondary air pump 32 is interchangeable, as desired by the designer. It is thus possible to utilize the method in various types of IC engines and with various types of supply of the air-fuel mixture and control of the composition, and amount of the mixture being supplied to the engine.

We claim:

1. Method to remove noxious components from the exhaust gases of an internal combustion (IC) engine, having an oxidizing reactor to oxidize hydrocarbons (HC) and carbon monoxide (CO) and a reducing reactor to reduce nitrogen oxygen ($NO_x$) compounds, serially connected in the exhaust system of the engine, said method comprising deriving (40) a sensed temperature signal representative of temperature in the exhaust system of the engine;

admitting air to the exhaust system of the engine;

controlling the admission of air to the exhaust system of the engine under control of the temperature signal;

deriving (41) a sensed oxygen signal representative of whether the gases in the exhaust system of the engine are reducing or oxidizing;

and controlling the mass ratio of air to fuel (air number λ) of the air-fuel mixture being supplied to the engine intake under control of said oxygen signal.

2. Method according to claim 1 wherein the step of admitting air to the exhaust system of the engine comprises the step of adding air into the exhaust system of the engine.

3. Method according to claim 1, wherein the step of admitting air to the exhaust system of the engine comprises the step of adding additional air to the intake of at least some of the cylinders of the engine.

4. Method according to claim 1, wherein the step of controlling the admission of air comprises adding additional air if the temperature signal is indicative of an exhaust system temperature below the operating temperature of at least one of the reactors;

and the step of controlling the mass ratio of the combined air and fuel components of the air-fuel mixture being fed to the engine comprises the step of controlling at least one of said components until the sensed oxygen signal is indicative of an air number of about $\lambda = 0.98$, so that, when the exhaust system is below operating temperature, additional air will be admitted, causing additional fuel to be admitted and the additional air-fuel quantities available in the exhaust system will thermally react therein and thus rapidly increase the operating temperature of the exhaust system of the reactors therein.

5. System to remove noxious components from the exhaust of an internal combustion engine in which the engine is connected to an exhaust system having a series connection of a first reactor (23) to oxidize unburned hydrocarbons and carbon monoxide, and a second reactor to reduce $NO_x$ components, comprising a temperature sensing element (40) in thermally conductive relation to the exhaust system of the engine and delivering a sensed temperature signal representative of temperature in the exhaust system of the engine;

means (32, 33, 34) admitting air in addition to the engine operating requirements to the exhaust system of the engine;

means (42, 43; 35, 54, 55, 36, 61, 72, 87, 45a, 45b) controlling the admission of additional air as a function of said temperature signal;

an oxygen sensing element (41) delivering a sensed oxygen signal representative of oxygen content in the exhaust system of the engine;

means (12, 13, 19, 20, 59, 60, 73, 74, 75, 76) admitting air and fuel to the engine;

and means (41, 44, 45, 18, 22, 53, 57, 72) controlling the air number (λ) of the air-fuel mixture being applied to the engine as a function of said oxygen signal.

6. System according to claim 5 wherein the means admitting air in addition to engine operating requirements comprises means (32, 33, 34, 37) adding additional air to the exhaust manifold of the engine.

7. System according to claim 6, further comprising a secondary air pump (32), duct means (34) interconnecting the pump (32) and the exhaust manifold (24–27; 23) of the engine and terminating close to the exhaust valve thereof;

and check valve means (37) in the duct means (34).

8. System according to claim 6, further comprising a secondary air filter (33) in advance of the secondary air pump.

9. System according to claim 7 comprising means driving the pump (32) from the crank shaft (31) of the engine (11).

10. System according to claim 9, wherein the driving means between the crank shaft (31) and the pump (32) comprises an electromagnetic coupling (61).

11. System according to claim 7, wherein the means controlling the admission of additional air comprises means controlling operation of the secondary air pump (32).

12. System according to claim 7 including connection means interconnecting the inlet to the secondary air pump (32) with the inlet pipe (13) of the IC engine (11).

13. System according to claim 7, wherein the means controlling the admission of additional air includes a control amplifier (42) and a threshold switch (43), the output of the threshold switch controlling operation of said additional air pump (32).

14. System according to claim 6, wherein the means controlling the admission of additional air comprises a first control loop including said temperature sensing element (40), a control amplifier (42) and a threshold switch (43);

air pressure means supplying air under pressure;

and controlled valve means (35) connecting said air pressure means to said means admitting additional air to the exhaust manifold of the engine, said controlled valve means being connected to and controlled by said threshold switch (43).

15. System according to claim 14, further comprising variable means (36), and means connecting the variation control of said variable valve means (36) to said control amplifier (42).

16. System according to claim 6, comprising a secondary air pump (32) connected to the means admitting additional air to the exhaust system of the engine;

an electric motor (55) driving said secondary air pump;

and wherein the means controlling the admission of additional air as a function of said temperature sensed signal comprises a control amplifier (54) connected to and controlling operation of the motor (55).

17. System according to claim 16 wherein said control amplifier controls the speed of said motor.

18. System according to claim 5, wherein the means controlling the air number (λ) comprises a control loop including a series circuit comprising an amplifier (45) and said oxygen sensing element (45).

19. System according to claim 18, wherein the means admitting air and fuel to the engine intake comprises a carburetor system including a fuel nozzle (19) and a throttle (18), and an air duct (21) terminating downstream of said throttle and taking in ambient air;

and electromagnetically operable valve means (22) located to control air flow through said air duct (21), and being controlled by the output of said control amplifier (45).

20. System according to claim 18, wherein the means admitting air and fuel to the engine intake comprises a carburetor system including a fuel nozzle (19), a throttle (18) and fuel supply means (20) supplying fuel to the fuel nozzle (19);

and electromagnetically controllable valve means (53) controlling fuel flow to said nozzle, said valve means being controlled by and connected to said control amplifier (45).

21. System according to claim 18, wherein the means admitting air and fuel to the engine intake comprises an air inlet manifold (13) and a throttle (18) and a fuel injection system including at least one injection nozzle (59), and a control switching circuit (57) connected to and energizing the injection nozzle (59) for predetermined periods of time depending on engine operation parameters, said control switching circuit having a control input (B) to influence said energization period;

the output of said control amplifier being connected to said energization control input (B) to additionally control the time duration of opening of the fuel injection nozzle in dependence on sensed oxygen levels in the exhaust of the engine.

22. System according to claim 21, including an air mass measuring device (58) located in the inlet manifold upstream of the throttle (18) and having an electrical output;

said electrical output being connected to said control switching circuit (57) to affect the pulse duration of the fuel injection pulse connected to the injection nozzle.

23. System according to claim 22, wherein said control switching circuit includes two switching stages, one switching stage providing a part-switching pulse and the second switching stage providing an extending pulse, the duration of which is a function of said part-switching pulse;

said air flow measuring device being connected to said first switching stage to control the length of said part-switching pulse, said part-switching pulse and said extending pulse conjointly controlling the opening of said injection nozzle.

24. System according to claim 5, for use with multi-cylinder engines, wherein the cylinders of the engine are divided into two groups, of at least on cylinder each, wherein the means admitting additional air and the means controlling the admission of additional air comprises one of said cylinder groups and means responsive to said temperature signal to admit additional fuel to said cylinder group so that unburned CO and HC will be present in the exhaust from said first cylinder group, and the means controlling the air-fuel mixture comprises the other of said cylinder groups and means responsive to said oxygen signal to decrease the amount of fuel being admitted to said second cylinder group below the stoichiometric value so that excess oxygen will be present in the exhaust from said second cylinder group, the excess oxygen from said second cylinder group burning the unburned CO and HC from said first cylinder group in the first reactor.

25. System according to claim 24, including at least one fuel injection valve (73, 74) associated with each cylinder group, and a control switching circuit (72) alternately energizing said injection valves, said control switching circuit having a pair of outputs (E, F), each being connected to one of the fuel injection valves;

and a control amplifier (45) interconnecting the oxygen sensing element (41) and said control switching circuit (72) to affect the switching duration, and hence the injection period of a selected one if said injection valves in accordance with sensed oxygen signal.

26. System according to claim 25, further comprising an air mass measuring device (58) interposed in the inlet manifold to the engine and having an electrical output, said electrical output being connected to said control switching circuit (72) to affect the pulse duration of all switching pulses derived from said control switching circuit and applied to said injection valves.

27. System according to claim 25, comprising a pulse source (69) controlling said control switching circuit to provide pulses in synchronism with engine rotation;

a bistable circuit (77) alternately energizing the fuel injection valves associated with said two groups of cylinders;

and logic circuit means (OR-gate 66, AND-gate 79, AND-gate 80) connecting the switching circuit (72) and the valves.

28. System according to claim 27, wherein said logic circuit includes AND-gates (79, 80) and the injection valves associated with the respective groups are connected to and controlled, respectively, by said AND-gates, said AND-gates being selectively energized in accordance with the changing of state of said bistable circuit.

29. System according to claim 25, wherein said means responsive to said oxygen signal further comprises a control amplifier (45) connected to and controlled by said oxygen sensing element (41);

said control switching circuit (72) having a control input responsive to signals and controlling, in response to such signals, the pulse duration of the output pulse provided by said control switching circuit (72) to a respective fuel injection valve;

and an adder resistor (92) interconnecting the control amplifier and said control input.

30. System according to claim 29, wherein the means controlling admission of additional air comprises a control amplifier (42) connected to and controlled by said temperature sensing element (40, two adder resistors (93, 94) and means connecting one of said adder resistors to the control input of said control switching circuit and inverter means connecting the other adder resistor to said control input of the control switching circuit;

and alternately operable switching means (88, 89) alternately switching one or the other of said two adder resistors in circuit with said control switching input, in synchronism with alternate energization of the injection valves associated with the respective cylinder groups.

31. System according to claim 24, including two carburetor systems (18a, 19a; 18b, 19b) one, each, being associated with a respective cylinder group;

pair of control amplifiers (45a, 45b), one each being associated with one of said carburetor systems and controlling the proportion of the air-fuel mixture being applied to the engine from each said carburetor systems as a function of one of said sensed signals;

and wherein the means responsive to said temperature signal comprises a control amplifier (42) and an inverter amplifier (87), connected in series, and responsive to the other of said sensed signals, and differentially controlling the air-fuel ratio being mixed by said respective carburetor systems.

32. System according to claim 31, wherein the first of said sensed signals is the oxygen signal and the other of said sensed signals is the temperature signal.

33. System according to claim 31, including an amplifier (44) connected to the oxygen sensing element to provide an amplified oxygen sensed signal;

a pair of adder resistors (100, 101) connected between the input of said control amplifiers;

an amplifier connected to the output of said temperature sensing element (40), an adder resistor (102) interconnecting the output of said amplifier (42) and the input of one of said control amplifiers (45a) and an inverter amplifier (87) connected to the output of said amplifier (42), an adder resistor (103) connecting the output of said inverter amplifiers to the input of the other of said control amplifiers, the output of said oxygen sensing amplifier (44) being applied to the input of said adder resistors (100, 101).

34. System according to claim 5, wherein the first reactor (28) is a thermo reactor and the second reactor (29) is a catalytic reactor.

35. System according to claim 5, wherein the first reactor is a thermo reactor and comprises a portion of the exhaust manifold and exhaust stubs (23; 24, 25, 26, 27) of the engine, said exhaust manifold and exhaust stubs having a thermally insulating wall (71).

36. System according to claim 5, wherein the means controlling the admission of additional air and the means controlling the air number ($\lambda$) comprises a control switching circuit, means (58) sensing the air quantity being introduced to the engine and providing an electrical control signal, said control signal being connected to said control switching means (57);

air pump means (32) providing said additional air to the exhaust system of the engine, and air inlet means (62) connected to said pump downstream of said air flow sensing means (58) and ahead of the throttle (18) for the engine.

* * * * *